Feb. 14, 1928.

W. H. BOUTELLE 1,659,189

OPHTHALMIC MOUNTING

Filed April 2, 1925

Inventor
William H. Boutelle.
By Harry H. Styll
Attorney

Patented Feb. 14, 1928.

1,659,189

UNITED STATES PATENT OFFICE.

WILLIAM H. BOUTELLE, OF STURBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

OPHTHALMIC MOUNTING.

Application filed April 2, 1925. Serial No. 20,230.

This invention relates to improvements in ophthalmic mountings, and has particular reference to the provision of an improved end piece and temple connection for spectacles.

An important object of the invention is to provide a spectacle end piece in which the temples will be securely held without tendency to drop or become loose.

Another object is to provide such a device in which there will be a greater amount of friction at the temple joint than has been possible with prior art structures.

Another object is to provide such a device in which the parts may be readily adjusted to increase the friction as they wear.

Another object is to provide such a device in which there will be no tendency for the temple holding screw to work loose due to the rotation of the temple.

Another object is to provide such a device which will be simple in construction, strong and durable in service, and an improvement in the art.

Referring now to the drawings, wherein similar reference characters designate corresponding parts throughout the several views.

Figure 1:
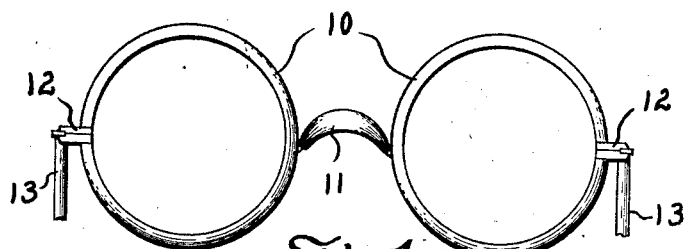
Figure 1 is a front elevation of a complete spectacle embodying the invention.
Figure 2:
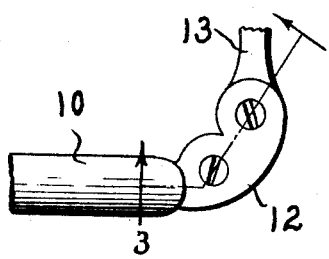
Figure 2 is an enlarged fragmentary plan view of the end piece and temple connection.

In Figure 1 is illustrated a conventional spectacle, comprising a pair of lens rims 10, being connected by a bridge 11, and having at their opposite sides end pieces 12, to which are secured temples 13. It is to be understood that the rims, bridge and temples may be of any ordinary or preferred construction, and that the main feature of this invention lies in the end piece and temple connection thereto.

Figure 3:
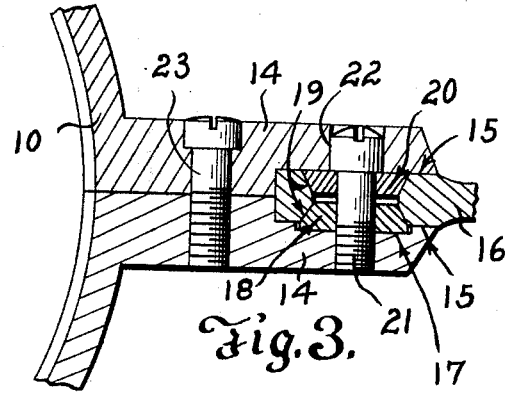
Figure 3 is a sectional view taken on the line 3—3 of Figure 2.

As best shown in Figure 3, the end piece 12 comprises a pair of end piece members 14, each end being secured to one of the meeting ends of the lens rim 10. Adjacent their outer extremities the opposed surfaces of the end piece members 14 are recessed as at 15, whereby to form a slot for the reception of the butt 16 of the temple 13. The recessed surface 15 of the lower half of the end piece is preferably further relieved as at 17 and adapted to receive a washer 18, which has a tapered frustro-conical surface, as clearly illustrated. The butt 16 of the temple is apertured, the walls of said aperture also being tapered as shown at 19 for engagement with the washer 18, and a second clamping member 20. A screw 21 extends through the members 18 and 20, and is threaded into the lower half 14 of the end piece in such a way that when said screw is tightened it will force the tapered washer 20 against the inclined aperture of the temple butt 16 and at the same time increase the friction of the temple butt against the tapered washer 18.

The upper half of the end piece is preferably formed with a clearance hole 22 in which is disposed the head of the screw 21 and a second screw 23 is used to clamp the two halves of the end piece together.

In use the parts are assembled as illustrated and described herein, the screw 21 being tightened to the extent that the temple may be moved about its pivot on the washers 18 and 20, but with sufficient frictional engagement to prevent its accidental displacement from the position in which it is put. In the course of time as the device is used, the bearing surfaces may become slightly worn, in which case the screw 21 may be tightened up the least bit to again increase the friction on the tapered surfaces 19.

With this construction the temple and the lens rims may always be relied upon to maintain their proper relationship, which is very important in an ophthalmic mounting carrying vision correcting lenses, since the lenses are intended for use in a fixed relationship to the wearer's eye. It is also to be noted that with this structure, and by virtue of the fact that one end piece member has a clearance hole 22 for the temple retaining screw, the two halves of the end piece may be separated for the changing of a lens in the lens rim 10 without disturbing the temple connection, which is a desirable feature from the standpoint of labor saving on the part of the prescription opticians.

Figure 4:
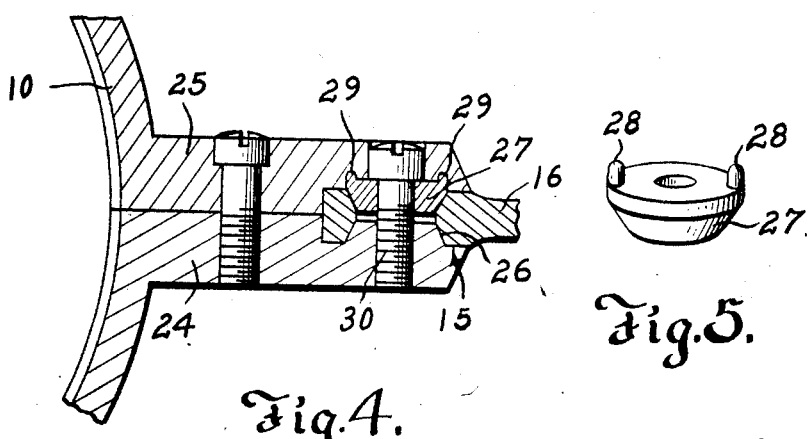
Figure 4 is a view similar to Figure 3, illustrating a modification.
Figure 5:
Figure 5 is a detail perspective view of the clamping washer used in the construction of Figure 4.

In Figure 4, a modification of the invention is illustrated, wherein the lens rim 10 carries two end piece halves 24 and 25, one of which has formed on its recessed surface 15 a frustro conical boss 26. The temple butt 16 is apertured as in the previous form of the invention, so as to be capable of engaging on the boss 26 and also with a tapered clamping member 27. The member 27 is held against rotation by the engagement of pins 28 in suitably formed recesses 29 in the end piece half 25 and an actuating screw 30 is provided to force the member 27 against the temple butt and the latter against the boss 26. A particular feature of this modification lies in the fact that the tapered clamping members cannot rotate and, therefore, there will be no tendency for the temple holding screw 30 to be moved or loosened by the movement of the temple about its pivotal center.

From the foregoing it will be evident that an improved end piece and temple connection has been formed which will be simple in construction and economical of manufacture; the frictional engagement of the temple by the end piece clamping members will be greater than has been possible with prior art devices and, therefore, the temple will not readily become loose. Also the parts are capable of being readily adjusted in the event that the bearing surfaces should become worn.

Obviously the invention is susceptible of further modification, and the right is herein reserved to make such changes as fall within the scope of the appended claims without departing from the spirit of the invention.

Having thus described my invention, I claim:

1. An ophthalmic mounting comprising a lens rim, a split end piece carried by the rim and provided with a temple receiving slot, a tapered boss integral with the end piece and extending into the slot, a temple butt mounted in the slot and having a tapered opening for the reception of the tapered boss, and screw means for varying the friction between the temple and the end piece.

2. An ophthalmic mounting comprising a lens rim, a split end piece carried by the rim and provided with a temple receiving slot, a tapered boss integral with the end piece and extending into the slot, a temple butt mounted in the slot and having a tapered opening for the reception of the tapered boss, a tapered washer engaging the opposite side of the temple from the boss, and means for clamping said washer against the temple, substantially as set forth.

3. In combination with the split lens rim of a spectacle, separable end piece members carried by the meeting ends of the lens rim, a temple receiving slot formed in the end piece members, a temple butt disposed in the slot and provided with a tapered opening, a tapered clamping washer disposed in the opening in the temple butt, portions of said washer extending into one of the end piece members to prevent its rotation, and means for frictionally engaging the tapered washer with the walls of the opening in the temple butt.

4. In combination with a split lens rim of an ophthalmic mounting, separable end piece members carried by the meeting ends of the lens rim having a temple receiving slot formed therein and a transverse opening through the end piece members communicating with the temple slot, a temple butt disposed in the slot provided with a tapererd opening, a tapered clamping washer disposed in the opening in the temple butt and screw means in the transverse opening of the end pieces having a portion communicating with the clamping washer and adapted to regulate the frictional contact of the clamping washer with the temple butt through the tightening or loosening thereof and to also act as a pivot for the temple butt end of the slot in the end pieces.

WILLIAM H. BOUTELLE.